Oct. 27, 1970     M. J. O'BRIEN     3,535,814
FISH LURE
Filed Sept. 30, 1968
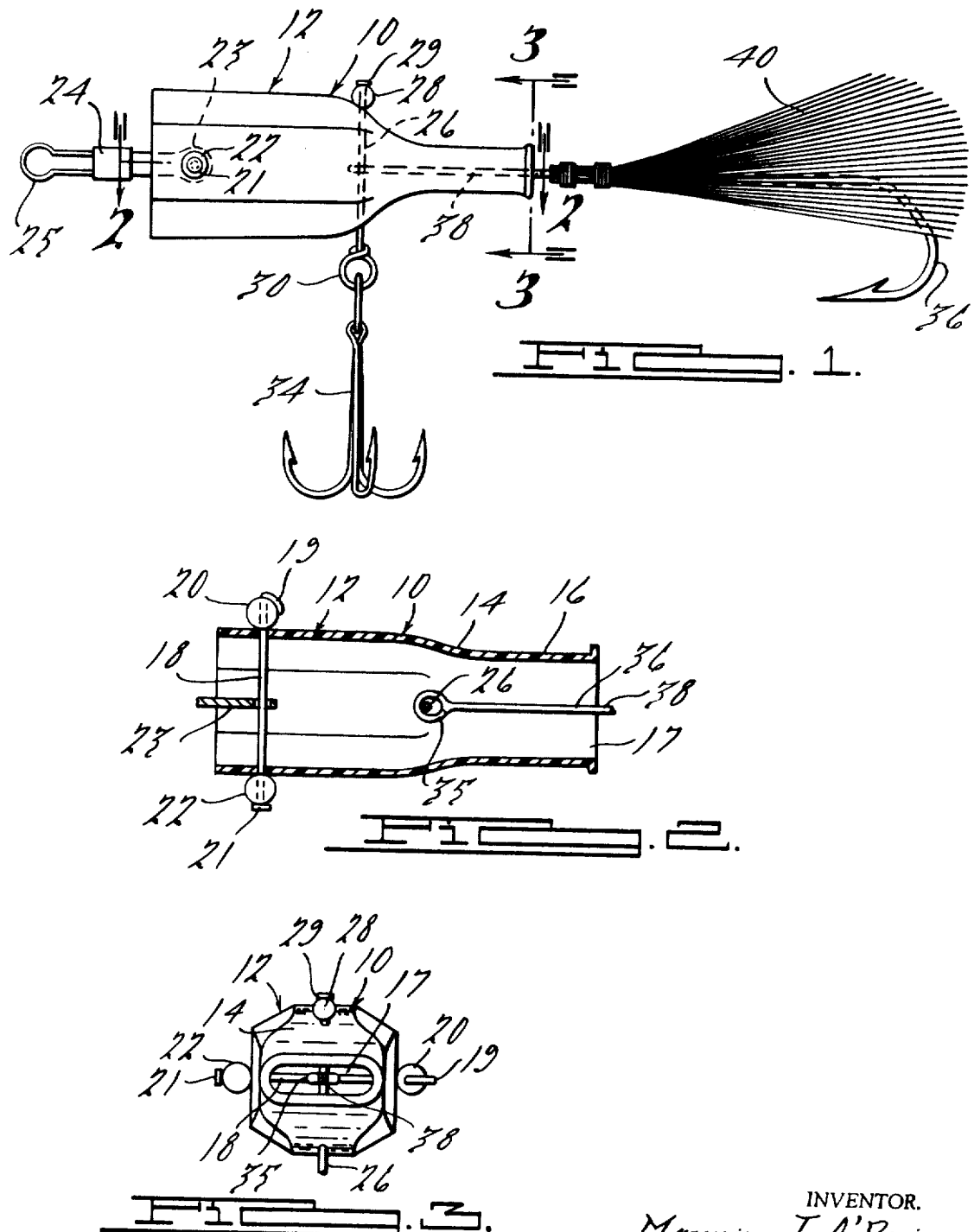
INVENTOR.
Marvin J. O'Brien
BY James P. Meloche
ATTORNEY United States Patent Office 3,535,814
Patented Oct. 27, 1970

1

3,535,814
FISH LURE
Marrin J. O'Brien, 30344 Blossom Road,
Roseville, Mich. 48066
Filed Sept. 30, 1968, Ser. No. 763,611
Int. Cl. A01k 85/00
U.S. Cl. 43—42.06        6 Claims

ABSTRACT OF THE DISCLOSURE

A fish lure comprising a hollow tube formed into a horizontal slot at the rear end thereof, a hook hinged inside said tube and passing through said slot, and a lead line attachment adapted to freely slide from one side of the tube to the other.

This invention relates to fish lures and, more particularly, to an improved lure of the articulated type which is adapted to be moved through the water and provide wiggling and other movement attractive to fish.

A specific embodiment of the invention is illustrated in the accompanying drawings wherein like parts are identified by the same numeral in the various figures.

FIG. 1 is a side elevation view of the hollow fish lure of the instant invention showing some internal structure in phantom.

FIG. 2 is a horizontal section of FIG. 1 taken along line 2—2 in FIG. 1.

FIG. 3 is a partial vertical section of FIG. 1 taken along line 3—3 in FIG. 1.

Referring more particularly to FIGS. 1–3, there is shown a hollow body 10 which is made up of three different sections: a tubular, generally cylindrical, front section 12, a tapering tubular transition middle section 14, and a flattened tubular slot section 16. All three sections have generally the same wall thickness and are tapered enough from the front to rear to allow easy release from a mold designed to form the body 10. As best seen in FIG. 3, the exterior of the front section 12 may be shaped as an octagon and slot section 16 provides a horizontal slot opening 17.

As best viewed in FIGS. 2 and 3, a pin 18 is located to be parallel to the major dimension of the horizontal slot opening 17 and passes through the walls of tube section 12 and through beads 20 and 22. Pin 18 is provided with suitable retaining heads such as 19 and 21 to hold the pin 18 and beads 20 and 22 in a fixed position on body 10. One end 23 of a slide link connector 24 is slidably attached to pin 18 and the opposite end 25 provides a fishing line attachment eye.

A pin 26 at right angles to pin 18 and slot 17 passes through the walls of the middle section 14 and through a bead 28. A suitable retaining head 29 secures bead 28 on the pin 26 while the bottom end of pin 26 terminates in a suitable loop or eye 30 to limit axial movement of pin 26 and to provide an attachment point for hook 34 and for weights as needed.

Pin 26 loosely passes through the eye 35 of hook 36 allowing hook 36 to pivot around pin 26. The shank 38 of hook 36 freely passes through the flattened slot section 16 and is covered by feather fly 40 outside of body 10.

The body 10 will preferably be painted to simulate fish coloring and the three beads may be decorated to simulate fish eyes. When the lure of this invention is pulled through the water using common bait casting fishing methods, the water enters the front section 12 and is forced to pass through the flattened section 16 causing the hook 36 to pivot back and forth about pin 26 and causing feather fly 40 to move in fish tail motion. The interacting motions provided by the horizontally slidable link connector 24 and the spaced horizontally-pivoting hook combined with the jet flow directed on the feather fly cause lure action in the water that has been found to attract fish to strike.

The invention may be enlarged or reduced in size to suit the size of fish being lured and the type of casting or trolling method employed by the angler. The bead 28 may be eliminated, if desired. To provide extra strength for the larger lures, a link may be provided connecting end 23 to eye 35 or to pin 26 to share the tension load with body 10.

Having thus described my invention it will be readily apparent to those skilled in the art to modify the particular lure herein described in many ways and I therefore intend the scope of the invention to be limited only by the appended claims.

I claim:
1. An artificial bait device comprising;
 (a) A tubular body having a first section, a tapering section, and a horizontally flattened section;
 (b) means attached to said first section of said body and including a horizontally slidable connection for attaching a fishing line to said body; and
 (c) hook means attached to said tapering section and having a horizontally pivotable connection thereto, said hook means passing through said flattened section and a feather fly secured to and covering said hook means externally of said tubular body.
2. The artificial bait device of claim 1 wherein;
 (a) said first section extends about 50% of the length of the tubular body and said flattened section extends about 30% of the length of said body.
3. The artificial bait device of claim 1 wherein;
 (a) said first section, said tapering section, and said flattened section are coaxial.
4. The artificial bait device of claim 1 wherein:
 (a) said means for attaching a fishing line includes a pin and a slide link connector.
5. The artificial bait device of claim 1 wherein:
 (a) said hook means includes an eye and is attached to the tapering section by a vertical pin passing through said eye of said hook.
6. The artificial bait device of claim 5 additionally including an external eyelet formed at the lower extremity of the vertical pin; and second hook means attached to said eyelet of said vertical pin.

References Cited

UNITED STATES PATENTS

| 2,091,457 | 8/1937 | Sauer | 43—42.49 X |
| 2,558,397 | 6/1951 | Toner | 43—42.22 X |
| 3,032,910 | 5/1962 | Crossan | 43—42.22 |
| 3,041,772 | 7/1962 | Laszlo | 43—42.06 |
| 3,092,925 | 6/1963 | Ho et al. | 43—42.06 X |

SAMUEL KOREN, Primary Examiner

D. J. Leach, Assistant Examiner

U.S. Cl. X.R.
43—42.15, 42.28, 42.49